(12) United States Patent
Kochiyama et al.

(10) Patent No.: US 10,662,645 B2
(45) Date of Patent: May 26, 2020

(54) SEISMIC ISOLATION APPARATUS

(71) Applicant: OILES CORPORATION, Tokyo (JP)

(72) Inventors: Osamu Kochiyama, Ashikaga (JP);
Kenta Nagahiro, Ashikaga (JP);
Yasunari Kimura, Ashikaga (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 16/070,871

(22) PCT Filed: Jan. 25, 2017

(86) PCT No.: PCT/JP2017/002600
§ 371 (c)(1),
(2) Date: Jul. 18, 2018

(87) PCT Pub. No.: WO2017/135128
PCT Pub. Date: Aug. 10, 2017

(65) Prior Publication Data
US 2019/0017264 A1 Jan. 17, 2019

(30) Foreign Application Priority Data

Feb. 1, 2016 (JP) .................................. 2016-017538

(51) Int. Cl.
*F16F 1/40* (2006.01)
*E04B 1/98* (2006.01)
(Continued)

(52) U.S. Cl.
CPC ................. *E04B 1/98* (2013.01); *E04H 9/02* (2013.01); *F16F 1/40* (2013.01); *F16F 13/04* (2013.01);
(Continued)

(58) Field of Classification Search
CPC ...... E04B 1/98; F16F 1/40; F16F 13/04; F16F 15/022; F16F 7/12; F16F 2224/0208;
(Continued)

(56) References Cited

U.S. PATENT DOCUMENTS 4,499,694 A * 2/1985 Buckle ...................... E04B 1/98
52/167.7
4,593,502 A * 6/1986 Buckle ...................... E04B 1/98
52/167.7
(Continued)

FOREIGN PATENT DOCUMENTS

CN 104781575 A 7/2015
EP 2 894 365 A1 7/2015
(Continued)

OTHER PUBLICATIONS

The First Office Action dated May 8, 2019 in Chinese Application No. 201780007882.6, with English translation, 16 pages.
(Continued)

*Primary Examiner* — Nkeisha Smith
(74) *Attorney, Agent, or Firm* — Nixon & Vanderhye P.C.

(57) ABSTRACT

A seismic isolation apparatus includes a laminated body having alternately laminated rubber plates and steel plates; a hollow portion provided inside the laminated body in a hermetically closed manner and extending in a laminated direction; a lead plug filled densely in the hollow portion and adapted to damp the vibration in a shearing direction of the laminated body by absorbing vibrational energy in the shearing direction; and a lid member having a semispherical concave surface which comes into contact with one end portion in the laminated direction A of the lead plug in order to guide and assist the plastic flow of the lead plug at one end portion in the laminated direction of the hollow portion in the deformation in the shearing direction of the lead plug.

20 Claims, 7 Drawing Sheets

(51) Int. Cl.
   *E04H 9/02* (2006.01)
   *F16F 13/04* (2006.01)
   *F16F 15/02* (2006.01)
   *F16F 7/12* (2006.01)

(52) U.S. Cl.
   CPC .............. *F16F 15/022* (2013.01); *F16F 7/12* (2013.01); *F16F 2224/025* (2013.01); *F16F 2224/0208* (2013.01); *F16F 2224/0233* (2013.01); *F16F 2236/103* (2013.01)

(58) Field of Classification Search
   CPC ......... F16F 2224/0233; F16F 2224/025; F16F 2224/103
   See application file for complete search history.

(56) References Cited

U.S. PATENT DOCUMENTS

| | | | | |
|---|---|---|---|---|
| 4,633,628 A * | 1/1987 | Mostaghel | ............ | E02D 27/34 52/167.7 |
| 4,713,917 A * | 12/1987 | Buckle | ................. | E01D 19/041 248/565 |
| 5,201,155 A * | 4/1993 | Shimoda | .............. | E01D 19/041 248/634 |
| 5,324,117 A * | 6/1994 | Matsushita | ............ | E04H 9/022 14/73.5 |
| 5,465,945 A * | 11/1995 | Matsushita | ............ | E04H 9/022 267/153 |
| 5,655,756 A * | 8/1997 | Robinson | ............... | E04H 9/022 267/140.2 |
| 5,761,856 A * | 6/1998 | Kishizono | .............. | E04H 9/022 52/167.8 |
| 6,385,918 B1 * | 5/2002 | Robinson | ................. | F16F 1/40 52/167.8 |
| 7,856,766 B2 * | 12/2010 | Takenoshita | ........... | E04H 9/022 248/636 |
| 8,668,968 B2 * | 3/2014 | Wakana | ................... | C08L 9/00 428/137 |
| 8,864,115 B2 * | 10/2014 | Kawada | .................... | F16F 1/40 267/141 |
| 9,085,896 B2 * | 7/2015 | Tsai | ......................... | E04B 1/98 |
| 9,617,730 B1 * | 4/2017 | Tsai | ....................... | F16F 13/04 |
| 9,771,997 B2 * | 9/2017 | Tsai | ......................... | F16F 1/40 |
| 9,933,036 B2 * | 4/2018 | Chen | ........................ | F16F 1/40 |
| 2010/0255233 A1 * | 10/2010 | Wakana | ................... | C08K 3/08 428/35.7 |
| 2010/0270719 A1 * | 10/2010 | Ranum | ................ | B60G 5/053 267/294 |
| 2013/0334749 A1 * | 12/2013 | Tsai | ......................... | E04B 1/98 267/140.11 |
| 2015/0191906 A1 * | 7/2015 | Kochiyama | ........... | E01D 19/041 52/167.7 |
| 2015/0361656 A1 * | 12/2015 | Miyazaki | ............... | B22D 19/16 52/167.8 |
| 2016/0025172 A1 * | 1/2016 | Halladay | ................. | B32B 25/02 267/141.1 |
| 2016/0122498 A1 * | 5/2016 | Wake | ....................... | C08K 3/04 52/167.1 |
| 2016/0146283 A1 * | 5/2016 | Sato | ......................... | F16F 15/04 267/141.1 |
| 2018/0030749 A1 * | 2/2018 | Wake | ....................... | E04H 9/02 |

FOREIGN PATENT DOCUMENTS

| | | |
|---|---|---|
| JP | 61-14338 A | 1/1986 |
| JP | 2000-145883 A | 5/2000 |
| JP | 2004-162765 A | 6/2004 |
| JP | 3649791 B2 | 2/2005 |
| JP | 2006-226417 A | 8/2006 |
| JP | 2006-308063 A | 11/2006 |
| JP | 2007-024287 A | 2/2007 |
| JP | 2008-281125 | 11/2008 |
| JP | 2009-8181 | 1/2009 |
| JP | 2009-115176 | 5/2009 |
| JP | 2010-25233 | 2/2010 |
| JP | 2014-47885 A | 3/2014 |
| KR | 2002-0076219 A | 10/2002 |
| KR | 20-0360331 Y1 | 8/2004 |
| KR | 10-2004-0096795 A | 11/2004 |
| KR | 10-2015-0040315 A | 4/2015 |
| RU | 2015 104 117 A | 10/2016 |
| TW | 201411007 A | 3/2014 |
| TW | 201602471 A | 1/2016 |
| WO | WO 2014/033986 A1 | 3/2014 |

OTHER PUBLICATIONS

International Search Report for PCT/JP2017/002600 dated Mar. 21, 2017, one (1) page.
Extended European Search Report dated Aug. 19, 2019 in European Application No. 17747287.5, 10 pages.
Notice of Reasons for Refusal dated Jul. 2, 2019 in Japanese Application No. 2016-017538, with English translation, 8 pages.
KIPO Notification of Reason for Refusal dated Sep. 9, 2019 in Korean Application No. 2018-7021545, with English translation, 15 pages.
Second Office Action dated Nov. 13, 2019 in Chinese Application No. 201780007882.6, with English translation, 18 pages.

\* cited by examiner

SEISMIC ISOLATION APPARATUS

This application is the U.S. national phase of International Application No. PCT/JP2017/002600 filed Jan. 25, 2017 which designated the U.S. and claims priority to JP Patent Application No. 2016-017538 filed Feb. 1, 2016, the entire contents of each of which are hereby incorporated by reference.

TECHNICAL FIELD

The present invention relates to a seismic isolation apparatus and more particularly to an apparatus which is disposed between two structures to reduce vibration acceleration from one structure to another by absorbing relative vibrational energy between the two structures, specifically to a seismic isolation apparatus for preventing damage to a structure such as a building, a bridge, and the like by reducing seismic input acceleration by attenuating seismic energy.

BACKGROUND ART

A seismic isolation apparatus is known which is comprised of a laminated body having alternately laminated elastic layers and rigid layers and a hollow portion defined by inner peripheral surfaces of these elastic layers and rigid layers, as well as a lead plug (lead column) disposed in the hollow portion of this laminated body and formed of lead as a damping material for damping the vibration in the shearing direction of the laminated body by absorbing vibrational energy in the shearing direction of the laminated body through deformation.

Such a seismic isolation apparatus is adapted to attenuate through the deformation of the lead plug the vibration in the horizontal direction of the structure with respect to one end in a laminated direction of the laminated body attributable to an earthquake, and also to suppress through the shear deformation of the laminated body the transmission, to the structure, of the vibration in the horizontal direction of the one end in the laminated direction of the laminated body ascribable to the earthquake.

PRIOR ART DOCUMENT

Patent Document

[Patent Document 1] JP-A-2009-8181

SUMMARY OF THE INVENTION

Problems that the Invention is to Solve

Incidentally, in the seismic isolation apparatus of this type, plastic flow of lead which forms the lead plug occurs in the deformation of the lead plug corresponding to the shear deformation of the laminated body, and this plastic flow takes place via one end of the lead plug disposed at one end of the hollow portion which is defined by an inner peripheral surface of the rigid layer at one end of the laminated body and by a surface of a closure member for closing the one end in the laminated direction of the hollow portion, with the result that the seismic isolation effect can be improved by allowing the plastic flow to effectively take place at the one end of the lead plug at the one end of this hollow portion.

Such plastic flow at the one end of the hollow portion is not limited to the lead of the lead plug for absorbing vibrational energy in the shearing direction of the laminated body through plastic deformation, but can also occur in a vibration damping member formed of other damping material which damps the vibration in the shearing direction of the laminated body by absorbing vibrational energy in the shearing direction of the laminated body through the plastic flow itself.

The present invention has been devised in view of the above-described aspects, and its object is to provide a seismic isolation apparatus which, in the deformation of the vibration damping member in the vibration in the shearing direction of the laminated body, is capable of effectively guiding and assisting the plastic flow of the vibration damping member at one end of the hollow portion and of further ensuring the plastic flow of the vibration damping member at the one end of the hollow portion, thereby making it possible to improve the seismic isolation effect.

Means for Solving the Problems

A seismic isolation apparatus in accordance with the present invention comprises: a laminated body having alternately laminated elastic layers and rigid layers; a hollow portion provided in an interior of the laminated body in a hermetically closed manner and extending in a laminated direction; a vibration damping member which is densely filled in the hollow portion and is adapted to damp the vibration in a shearing direction of the laminated body by absorbing vibrational energy in the shearing direction of the laminated body; and a closure member which closes one end in the laminated direction of the hollow portion and has a flow guiding concave surface which comes into contact with one end portion in the laminated direction of the vibration damping member, in order to guide and assist the plastic flow of the vibration damping member at one end portion in the laminated direction of the hollow portion in the deformation of the vibration damping member due to the vibration in the shearing direction of the laminated body, the hollow portion being defined by inner peripheral surfaces of the elastic layers and the rigid layers and by the flow guiding concave surface.

According to the seismic isolation apparatus in accordance with the present invention, the closure member, which closes the one end in the laminated direction of the hollow portion in which the vibration damping member is densely filled for damping the vibration in the shearing direction of the laminated body by absorbing vibrational energy in the shearing direction of the laminated body, has the flow guiding concave surface which comes into contact with the one end portion in the laminated direction of the vibration damping member, in order to guide and assist the plastic flow of the vibration damping member at the one end portion in the laminated direction of the hollow portion in the deformation of the vibration damping member due to the vibration in the shearing direction of the laminated body. Therefore, in the deformation in the vibration damping member due to the vibration in the shearing direction of the laminated body, it is possible to effectively guide and assist the plastic flow of the vibration damping member at the one end portion of the hollow portion, and it is possible to more effectively ensure the plastic flow of the one end portion of the vibration damping member at the one end portion of the hollow portion, thereby making possible to further improve the seismic isolation effect.

In the seismic isolation apparatus in accordance with the present invention, the flow guiding concave surface may have any form insofar as the flow guiding concave surface is capable of guiding and assisting the plastic flow of the vibration damping member at one end portion in the laminated direction of the hollow portion in the deformation of the vibration damping member due to the vibration in the shearing direction of the laminated body. In a preferred example, however, the hollow portion includes a columnar hollow portion defined by the inner peripheral surfaces of the elastic layers and the rigid layers and a semispherical hollow portion defined by the flow guiding concave surface, and the flow guiding concave surface has a semispherical concave surface. In another preferred example, the hollow portion includes a columnar hollow portion defined by the inner peripheral surfaces of the elastic layers and the rigid layers and a truncated conical hollow portion defined by the flow guiding concave surface, and the flow guiding concave surface has a semispherical concave surface and a flat surface connected continuously to the semispherical concave surface. In still another preferred example, the hollow portion includes a quadrangular prism-like hollow portion defined by the inner peripheral surfaces of the elastic layers and the rigid layers and a semicolumnar hollow portion defined by the flow guiding concave surface, and the flow guiding concave surface has a semicylindrical concave surface. In a further preferred example, the hollow portion includes a quadrangular prism-like hollow portion defined by the inner peripheral surfaces of the elastic layers and the rigid layers and a rectangular base-shaped hollow portion defined by the flow guiding concave surface, and the flow guiding concave surface has a pair of semicylindrical concave surfaces and a flat surface connected continuously to each of the pair of semicylindrical concave surfaces.

The seismic isolation apparatus in accordance with the present invention may further comprise: another closure member which closes another end in the laminated direction of the hollow portion and has another flow guiding concave surface which comes into contact with another end portion in the laminated direction of the vibration damping member, in order to guide and assist the plastic flow of the vibration damping member at another end portion in the laminated direction of the hollow portion in the deformation of the vibration damping member due to the vibration in the shearing direction of the laminated body. In this case, the hollow portion is further defined by the other flow guiding concave surface.

In the seismic isolation apparatus in accordance with the present invention which further comprises the other closure member having the other flow guiding concave surface, in the deformation in the vibration damping member due to the vibration in the shearing direction of the laminated body, it is also possible to effectively guide and assist the plastic flow of the other end portion of the vibration damping member at the other end portion of the hollow portion, and it is possible to more effectively ensure the plastic flow of the other end portion of the vibration damping member at the other end portion of the hollow portion, thereby making possible to further improve the seismic isolation effect.

In the seismic isolation apparatus in accordance with the present invention which further comprises such other closure member, in a preferred example, the hollow portion includes a columnar hollow portion defined by the inner peripheral surfaces of the elastic layers and the rigid layers and a semispherical hollow portion defined by the other flow guiding concave surface, and the other flow guiding concave surface has a semispherical concave surface. In another preferred example, the hollow portion includes a columnar hollow portion defined by the inner peripheral surfaces of the elastic layers and the rigid layers and a truncated conical hollow portion defined by the other flow guiding concave surface, and the other flow guiding concave surface has a semispherical concave surface and a flat surface connected continuously to the semispherical concave surface. In still another preferred example, the hollow portion includes a quadrangular prism-like hollow portion defined by the inner peripheral surfaces of the elastic layers and the rigid layers and a semicolumnar hollow portion defined by the other flow guiding concave surface, and the other flow guiding concave surface has a semicylindrical concave surface. In a further preferred example, the hollow portion includes a quadrangular prism-like hollow portion defined by the inner peripheral surfaces of the elastic layers and the rigid layers and a rectangular base-shaped hollow portion defined by the other flow guiding concave surface, and the other flow guiding concave surface has a pair of semicylindrical concave surfaces and a flat surface connected continuously to each of the pair of semicylindrical concave surfaces.

In the case of the seismic isolation apparatus in accordance with the present invention in which the hollow portion includes a columnar hollow portion and a semispherical hollow portion or a truncated conical hollow portion, it is possible to more effectively ensure the plastic flow of the vibration damping member at one end or the other end of the hollow portion in correspondence with the deformation of the laminated body in various shearing directions. Meanwhile, in the case of the seismic isolation apparatus in accordance with the present invention in which the hollow portion includes a quadrangular prism-like hollow portion and a semicolumnar hollow portion or a rectangular base-shaped hollow portion, it is possible to more effectively ensure the plastic flow of the vibration damping member at one end or the other end of the hollow portion in correspondence with the deformation of the laminated body in a shearing direction perpendicular to a center line of the cylindrical concave surface defining the semicolumnar hollow portion or the rectangular base-shaped hollow portion. Thus, in the former case, it is possible to provide a seismic isolation apparatus having non-directionality with respect to the shear deformation of the laminated body, whereas, in the latter case, it is possible to provide a seismic isolation apparatus having directionality with respect to the shear deformation of the laminated body.

In the seismic isolation apparatus in accordance with the present invention, in a preferred example, the vibration damping member is formed of a damping material which effects absorption of vibrational energy through deformation, and such a damping material may be constituted of lead, tin, zinc, aluminum, copper, nickel, or an alloy thereof, or may be constituted of lead, tin, or a non-lead-based low melting point alloy (e.g., a tin-containing alloy selected from a tin-zinc-based alloy, a tin-bismuth-based alloy, and a tin-indium-based alloy; specifically, such as a tin-bismuth alloy containing 42 to 43 wt. % of tin and 57 to 58 wt. % of bismuth), or may be constituted of a superplastic alloy of a zinc-aluminum alloy or the like. In another preferred example, the vibration damping member is formed of a damping material which effects absorption of vibrational energy through plastic flow, and such a damping material which absorbs vibrational energy through plastic flow may include a thermoplastic resin or a thermosetting resin and a rubber powder. As a preferred example of the thermoplastic resin, it is possible to cite a tackifier resin. The thermosetting resin may preferably include a phenolic resin such as a resol type phenolic resin obtained by reacting various phenols and formaldehyde in the presence of an alkaline catalyst and a novolak type phenolic resin obtained by reacting in the presence of an acid catalyst. The thermosetting resin may be finely pulverized by deformation in the recurring vibrations of the vibration damping member after curing. The vibration damping member formed of such a damping material may have a single lumpy body or may alternatively have the form of such as split laminated bodies which are split and laminated in the laminated direction or a compressed body obtained by compressing a granular or powdery damping material.

As the material of the elastic layer in the seismic isolation apparatus in accordance with the present invention, it is possible to cite rubbers such as natural rubber, silicone rubber, highly damping rubber, urethane rubber, or chloroprene rubber, but natural rubber is preferable. Each of the elastic layers such as rubber plates formed of such a rubber preferably has a thickness of 1 mm to 30 mm or thereabouts in a no-load condition, but the invention is not limited to the same. In addition, as preferred examples of the rigid layer, it is possible to cite a steel plate, a fiber-reinforced synthetic resin plate using a carbon fiber, a glass fiber, an aramid fiber, or the like, a fiber-reinforced hard rubber plate, and the like. Each of the rigid layers may have a thickness of 1 mm to 6 mm or thereabouts, or the uppermost and lowermost rigid layers in the laminated direction may have a thickness of, for example, 10 mm to 50 mm or thereabouts, which thickness is greater than the rigid layers other than the uppermost and lowermost rigid layers, i.e., those disposed between the uppermost and lowermost rigid layers, but the invention is not limited to the same. In addition, the elastic layers and the rigid layers in terms of their numbers are not particularly limited, and the numbers of the elastic layers and the rigid layers may be determined to obtain stable seismic isolation characteristics from the viewpoints of the load of a seismic isolation object, the amount of shear deformation (amount of horizontal strain), the modulus of elasticity of the elastic layers, and the estimated magnitude of vibration acceleration to the seismic isolation object.

In addition, in the present invention, the hollow portion provided in the interior of the laminated body in a hermetically closed manner may be singular, but may alternatively be plural, and the seismic isolation apparatus may be constructed such that vibration damping members are respectively disposed in these hollow portions, and all or some of the plurality of hollow portions are defined by the inner peripheral surfaces of the above-described elastic layers and rigid layers and flow guiding concave surfaces, so that the vibration damping members in said all or some of the plurality of hollow portions are restricted by these inner peripheral surfaces and flow guiding concave surfaces.

Advantages of the Invention

According to the present invention, it is possible to provide a seismic isolation apparatus which, in the deformation of the vibration damping member in the vibration in the shearing direction of the laminated body, is capable of effectively guiding and assisting the plastic flow of the vibration damping member at one end of the hollow portion and of further ensuing the plastic flow of the vibration damping member at the one end of the hollow portion, thereby making it possible to improve the seismic isolation effect.

MODE FOR CARRYING OUT THE INVENTION

Hereafter, a detailed description will be given of the mode for carrying out the invention on the basis of preferred embodiments illustrated in the drawings. It should be noted that the present invention is not limited to these embodiments.

In FIGS. 1 to 4, a seismic isolation apparatus 1 in accordance with this embodiment is comprised of a cylindrical laminated body 7 including a plurality of annular rubber plates 2, serving as elastic layers, and steel plates 3, serving as rigid layers, which are alternately superposed one on top of another, as well as a cylindrical coating layer 6 coating annular outer peripheral surfaces 4 and 5 of the rubber plates 2 and the steel plates 3 and formed of the same rubber material as the rubber plates 2; a hollow portion 8 provided in the interior of the laminated body 7 in a hermetically closed manner and extending in a laminated direction A; a lead plug 9 serving as a vibration damping member which is densely filled in the hollow portion 8 and is adapted to damp the vibration in a shearing direction B of the laminated body 7 by absorbing vibrational energy in the shearing direction B of the laminated body 7 through deformation in the shearing direction B; a lid member 14 serving as a closure member which closes one end 13 in the laminated direction A of the hollow portion 8 and has a semispherical concave surface 12 as a flow guiding concave surface which comes into contact with one end portion 11 in the laminated direction A of the lead plug 9, in order to guide and assist the plastic flow of the lead plug 9 at one end portion 10 in the laminated direction A of the hollow portion 8 in the deformation in the shearing direction B of the lead plug 9 due to the vibration in the shearing direction B of the laminated body 7; a lid member 19 serving as a closure member for closing another end 18 in the laminated direction A of the hollow portion 8 and having a semispherical concave surface 17 as a flow guiding concave surface which comes into contact with another end portion 16 in the laminated direction A of the lead plug 9, in order to guide and assist the plastic flow of the lead plug 9 at another end portion 15 in the laminated direction A of the hollow portion 8 in the deformation in the shearing direction B of the lead plug 9 due to the vibration in the shearing direction B of the laminated body 7; an annular upper mounting plate 21 provided on an annular upper surface 20 of the laminated body 7; and an annular lower mounting plate 23 provided on an annular lower surface 22 of the laminated body 7.

Figure 1:
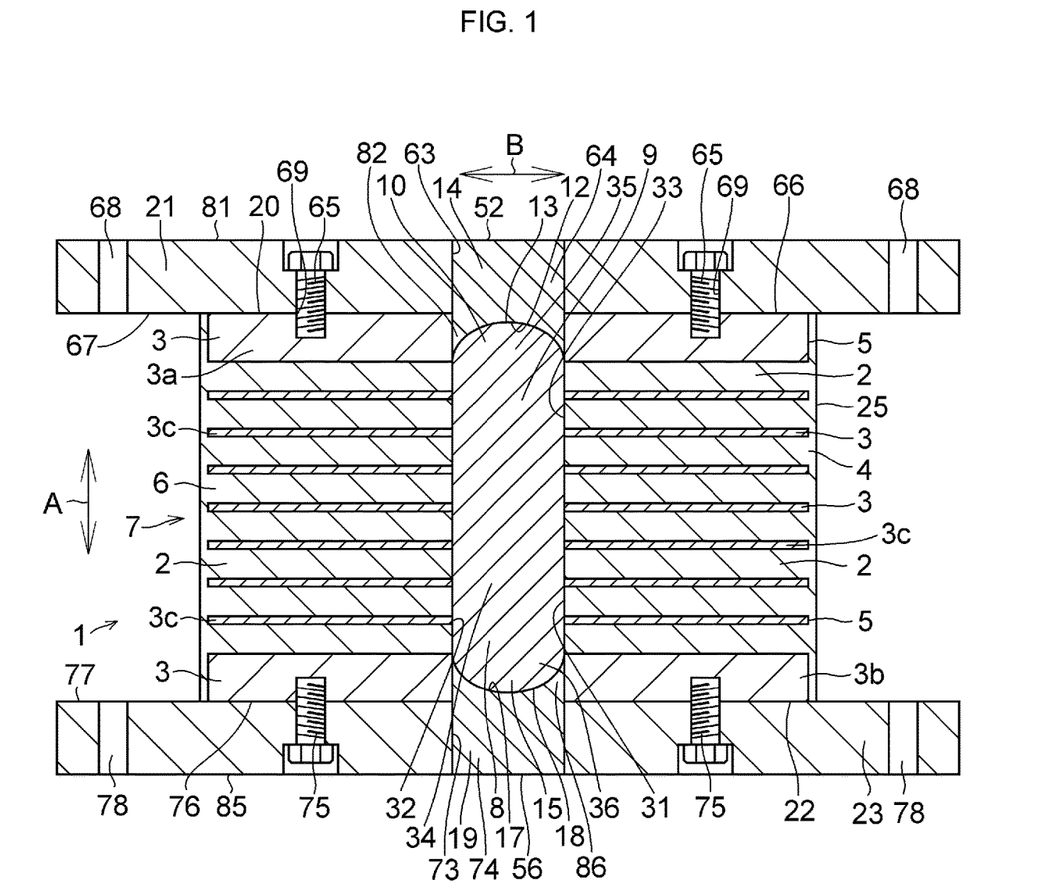
FIG. 1 is a cross-sectional view, taken in the direction of arrows along line I-I shown in FIG. 2, of a preferred embodiment for carrying out the invention.

The steel plates 3 include uppermost and lowermost annular steel plates 3a and 3b as viewed in the laminated direction A and a plurality of annular steel plates 3c between the steel plates 3a and 3b in the laminated direction A. The steel plates 3a and 3b respectively have thicknesses which are identical to each other and are greater than the respective thickness of the steel plates 3c, and the plurality of steel plates 3c respectively have thicknesses which are identical to each other and are smaller than the respective thickness of the steel plates 3a and 3b.

In the laminated body 7 having a cylindrical outer peripheral surface constituted by a cylindrical outer peripheral surface 25 of the coating layer 6, the rubber plates 2, the steel plates 3, and the coating layer 6 are respectively vulcanization bonded to each other and are integrated.

The hollow portion 8 includes a columnar hollow portion 34 defined by a cylindrical inner peripheral surface 33 which is constituted by respective annular inner peripheral surfaces 31 of the rubber plates 2 and respective annular inner peripheral surfaces 32 of the steel plates 3c; a semispherical hollow portion 35 defined by the semispherical concave surface 12 and connected continuously to one end face of the columnar hollow portion 34 in the laminated direction A; and a semispherical hollow portion 36 defined by the semispherical concave surface 17 and connected continuously to another end face of the columnar hollow portion 34 in the laminated direction A.

Figure 3:
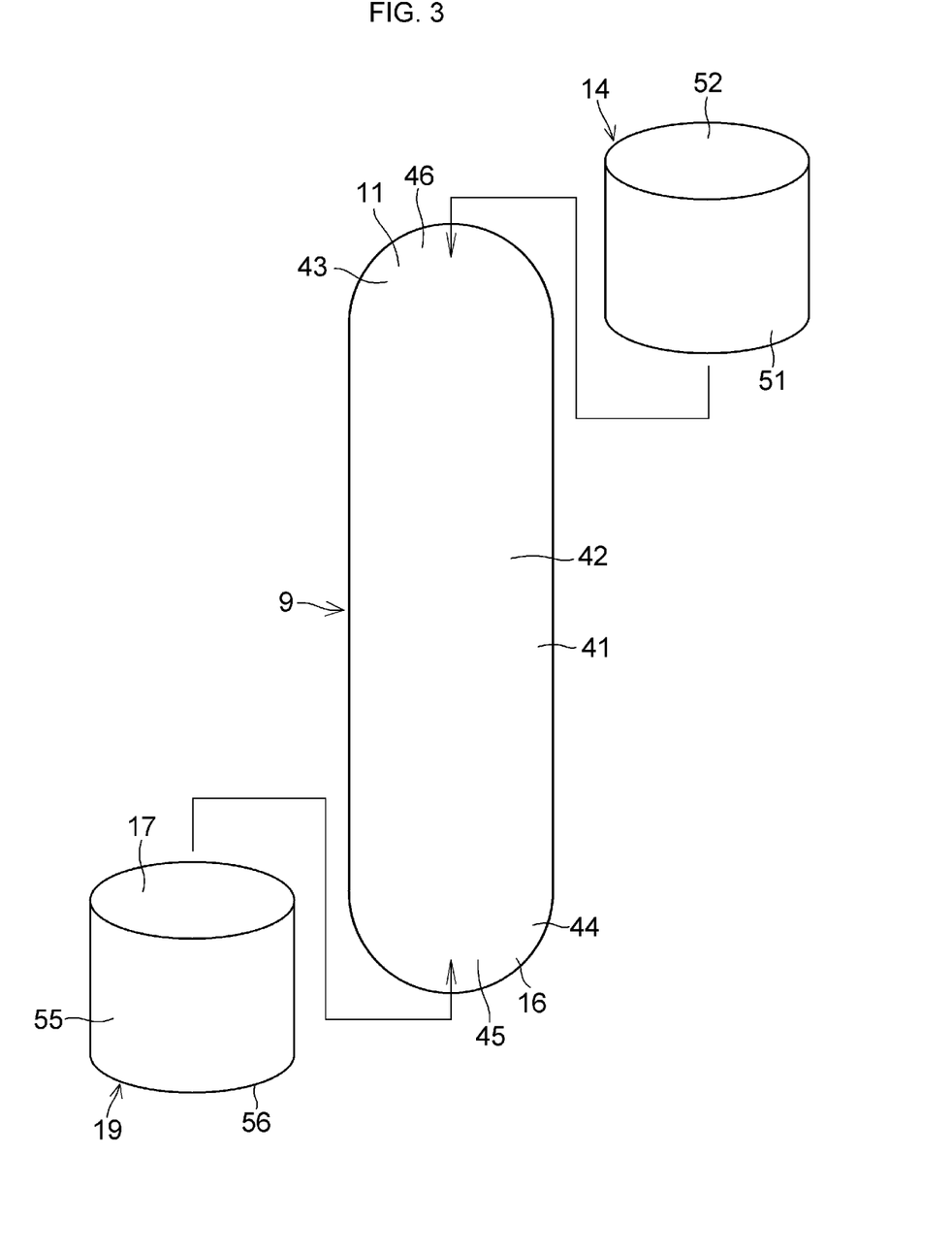
FIG. 3 is a detailed explanatory perspective view of a lead plug and lid members in the embodiment of FIG. 1.

The lead plug 9, which is formed of lead with a purity of 99.9% or thereabouts as a damping material for absorbing vibrational energy through deformation, includes a columnar portion 42 having a cylindrical outer peripheral surface 41 which is in close contact with the inner peripheral surface 33 without a clearance; a semispherical portion 43 as the one end portion 11 having a semispherical convex surface 46 which is continuously connected to one end face of the columnar portion 42 in the laminated direction A and is in close contact with the semispherical concave surface 12 without a clearance; and a semispherical portion 45 as the other end portion 16 having a semispherical convex surface 44 which is continuously connected to the other end face of the columnar portion 42 in the laminated direction A and is in close contact with the semispherical concave surface 17 without a clearance.

In addition to the semispherical concave surface 12 having the same radius of curvature as the radius of the inner peripheral surface 33, the lid member 14 includes a cylindrical surface 51 having the same diameter as the inner peripheral surface 33 and a circular surface 52 opposed to the semispherical concave surface 12 in the laminated direction A and having the same diameter as the inner peripheral surface 33. Also, in addition to the semispherical concave surface 17 having the same radius of curvature as the radius of the inner peripheral surface 33, the lid member 19 includes a cylindrical surface 55 having the same diameter as the inner peripheral surface 33 and a circular surface 56 opposed to the semispherical concave surface 12 in the laminated direction A and having the same diameter as the inner peripheral surface 33.

Figure 2:
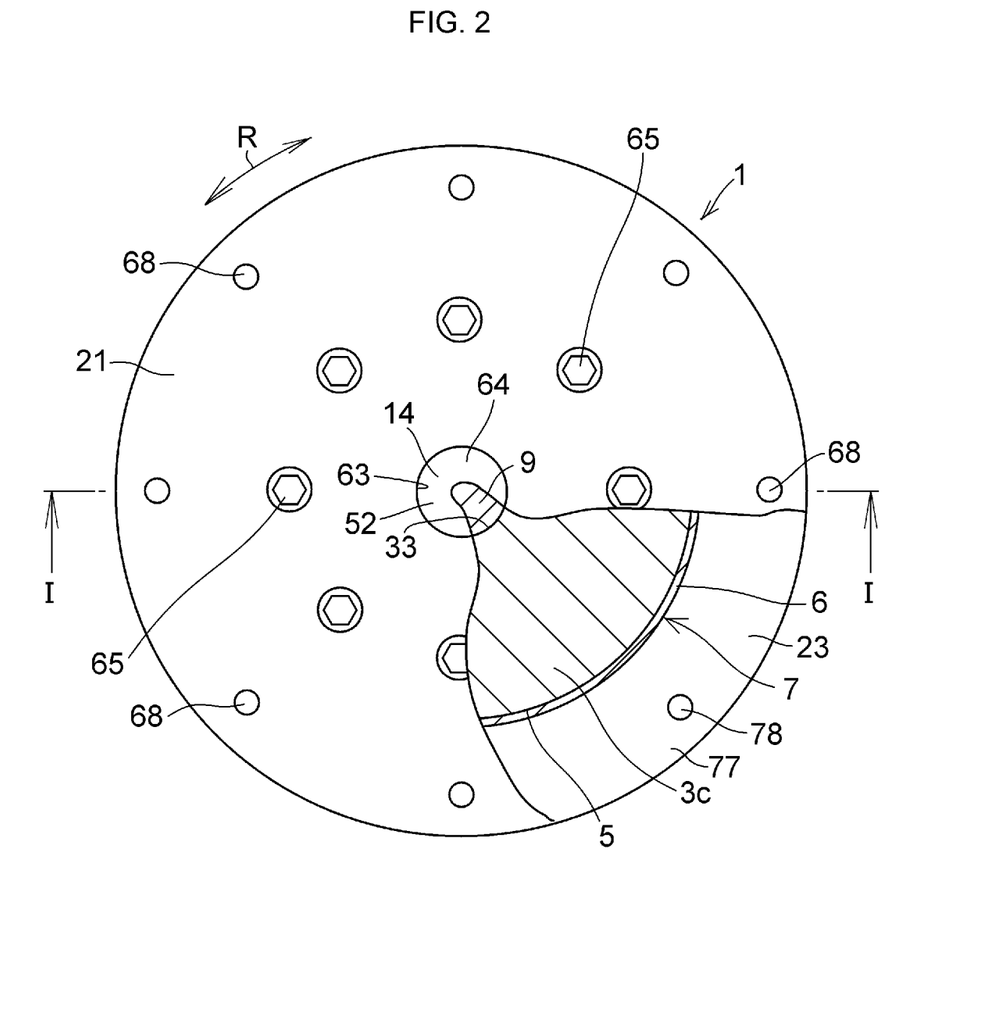
FIG. 2 is an explanatory plan view of the embodiment of FIG. 1.

The upper mounting plate 21 for mounting the seismic isolation apparatus 1 to a superstructure 61, i.e., one structure, via a plurality of anchor bolts 62 has a circular through hole 64 defined by a cylindrical inner peripheral surface 63 having the same diameter as the inner peripheral surface 33 and is fixed at a lower surface 67 to an upper surface 66 of the steel plate 3a via a plurality of bolts 65. The upper mounting plate 21 having the through hole 64 in the center has a plurality of through holes 68 and 69 into which the anchor bolts 62 and the bolts 65 are respectively inserted and which are arranged at equal intervals in a circumferential direction R. The lower mounting plate 23 for mounting the seismic isolation apparatus 1 to a substructure 71, i.e., another structure, via a plurality of anchor bolts 72 has a through hole 74 defined by an inner peripheral surface 73 having the same diameter as the inner peripheral surface 33 and is fixed at an upper surface 77 to a lower surface 76 of the steel plate 3b via a plurality of bolts 75. The lower mounting plate 23 having the through hole 74 in the center has a plurality of through holes 78 and 79 into which the anchor bolts 72 and the bolts 75 are respectively inserted and which are arranged at equal intervals in the circumferential direction R.

The lid member 14 is fixed to the upper mounting plate 21 by welding or the like by being fitted to the steel plate 3a and the upper mounting plate 21 without a clearance, the lid member 14 being fitted in a circular through hole 82 of the steel plate 3a defined by the inner peripheral surface 32 of the steel plate 3a connected continuously to the inner peripheral surface 33 with the same diameter as the inner peripheral surface 33 and in the though hole 64 communicating with the through hole 82, such that the circular surface 52 thereof is flush with an annular upper surface 81 of the upper mounting plate 21. The lid member 19 is fixed to the lower mounting plate 23 by welding or the like by being fitted to the steel plate 3b and the lower mounting plate 23, the lid member 19 being fitted in a circular through hole 86 of the steel plate 3b defined by the inner peripheral surface 32 of the steel plate 3b connected continuously to the inner peripheral surface 33 with the same diameter as the inner peripheral surface 33 and in the circular though hole 74 communicating with the through hole 86, such that the circular surface 56 thereof is flush with an annular lower surface 85 of the lower mounting plate 23.

Figure 4:
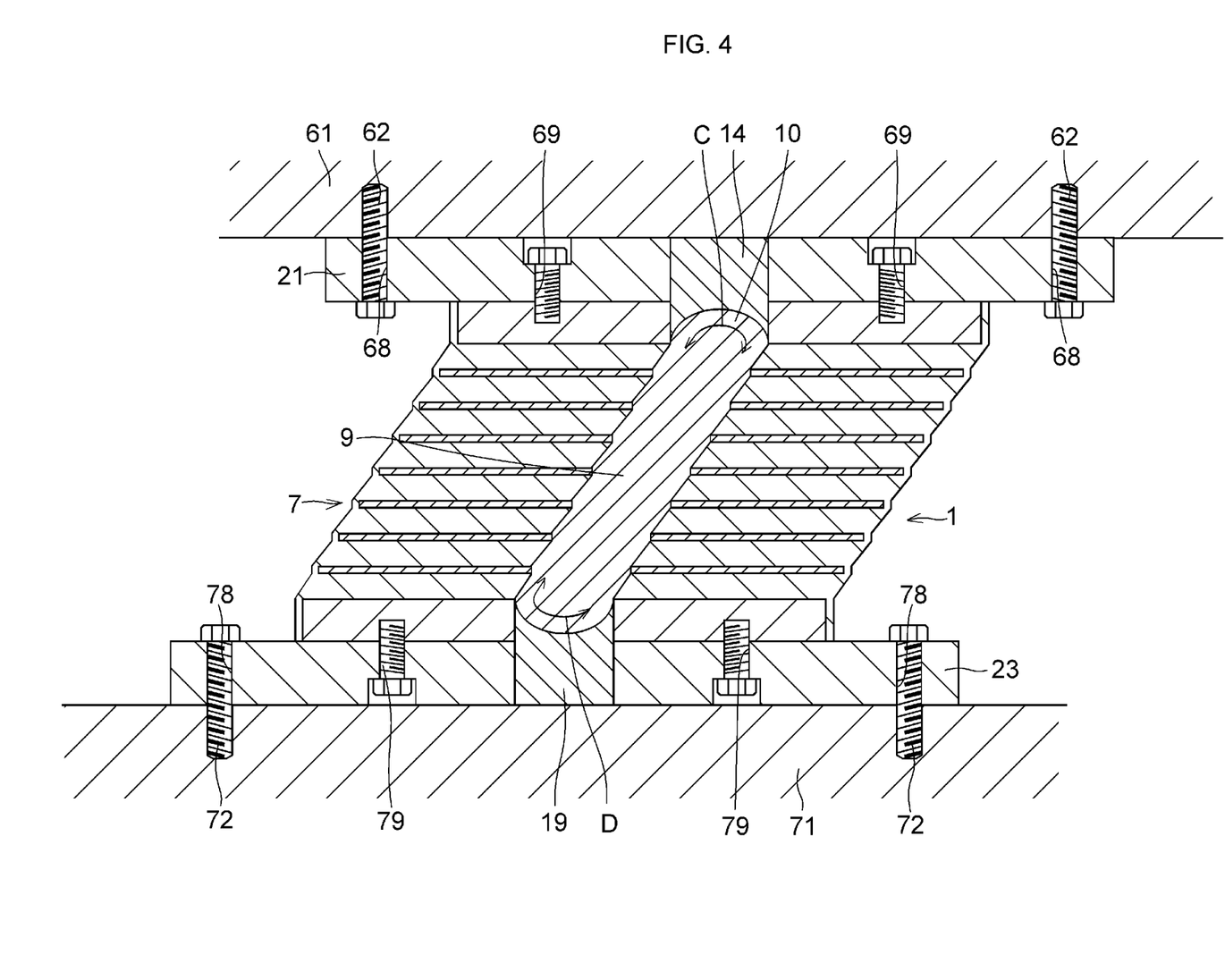
FIG. 4 is a diagram explaining the operation in the embodiment of FIG. 1.

In the above-described seismic isolation apparatus 1 which is interposed between the superstructure 61 and the substructure 71 in the laminated direction A and receives the vertical load of the superstructure 61, the laminated body 7 and the lead plug 9 are subjected to shear deformation in the shearing direction B, as shown in FIG. 4, owing to the vibration in the horizontal direction (shearing direction B) of the substructure 71 with respect to the superstructure 61 during such as an earthquake, and the rubber plates 2 suppress the transmission of acceleration in the horizontal direction of the substructure 71 to the superstructure 61 during the earthquake or the like owing to the shear deformation thereof in the shearing direction B, while the lead plug 9 damps the horizontal vibration transmitted from the substructure 71 to the superstructure 61 through the deformation thereof in the shearing direction B. Thus, the seismic isolation apparatus 1 is adapted to support the superstructure 61 with respect to the substructure 71 in a seismically isolated manner.

In the seismic isolation apparatus 1, the lid member 14, which closes the one end 13 in the laminated direction A of the hollow portion 8 in which the lead plug 9 is densely filled for damping the vibration in the shearing direction B of the laminated body 7 by absorbing vibrational energy in the shearing direction B of the laminated body 7, has the semispherical concave surface 12 which comes into contact with the one end portion 11 constituted by the semispherical portion 43 in the laminated direction A of the lead plug 9, in order to guide and assist the plastic flow C of the lead plug 9 at the one end portion 10 in the laminated direction A of the hollow portion 8 in the deformation in the shearing direction B of the lead plug 9 due to the vibration in the shearing direction B of the laminated body 7. Meanwhile, the lid member 19, which closes the other end 18 in the laminated direction A of that hollow portion 8, has the semispherical concave surface 17 which comes into contact with the other end portion 16 constituted by the semispherical portion 45 in the laminated direction A of the lead plug 9, in order to guide and assist the plastic flow D of the lead plug 9 at the other end portion 15 in the laminated direction A of the hollow portion 8 in the deformation in the shearing direction B of the lead plug 9 due to the vibration in the shearing direction B of the laminated body 7. Therefore, in the deformation in the shearing direction B of the lead plug 9 due to the vibration in the shearing direction B of the laminated body 7, it is possible to effectively guide and assist the plastic flow C and D of the one end portion 11 and the other end portion 16 of the lead plug 9 at the one end portion 10 and the other end portion 15 of the hollow portion 8 owing to the deformation in the shearing direction B of that lead plug 9, and it is possible to more effectively ensure the plastic flow C and D of the one end portion 11 and the other end portion 16 of the lead plug 9 at the one end portion 10 constituted by the semispherical hollow portion 35 of the hollow portion 8 and the other end portion 15 constituted by the semispherical hollow portion 36 thereof, thereby making possible to further improve the seismic isolation effect.

Figure 5:
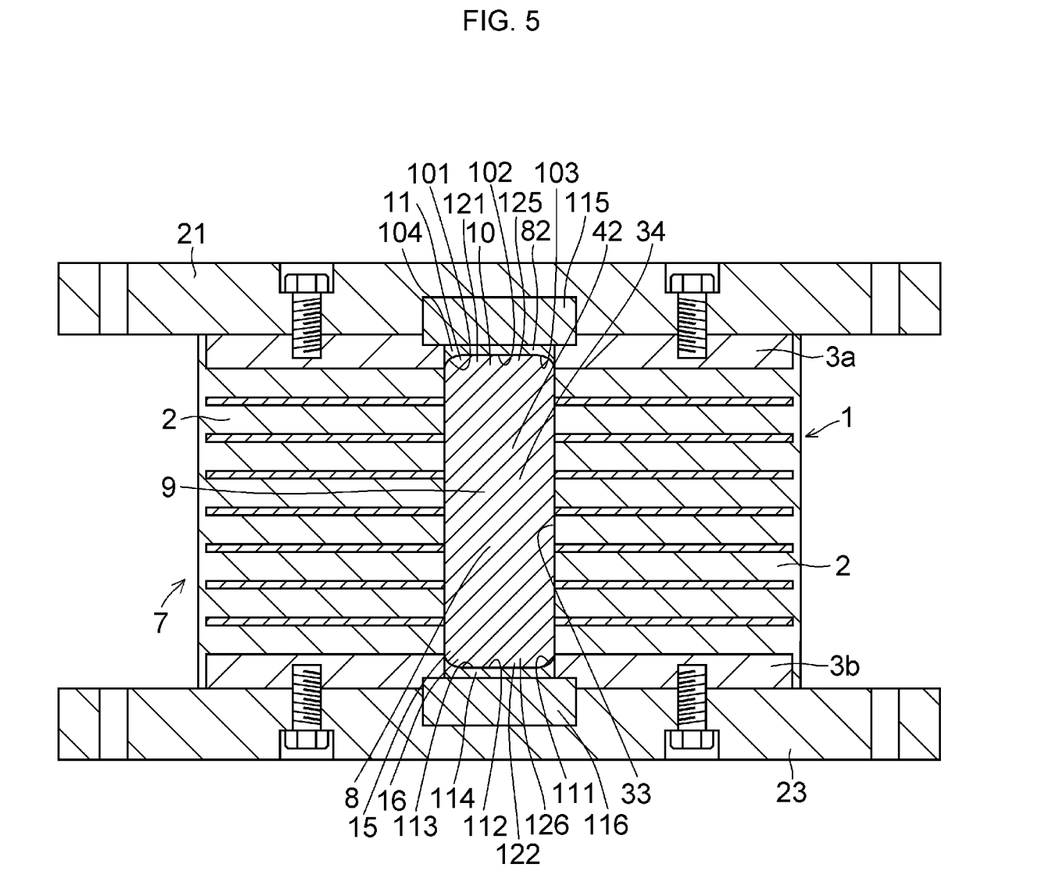
FIG. 5 is an explanatory cross-sectional view of another preferred embodiment of the invention.

In the above-described seismic isolation apparatus 1, the hollow portion 8 has the columnar hollow portion 34 and the semispherical hollow portions 35 and 36. Alternatively, however, as shown in FIG. 5, a disk-like lid member 104 may be fitted in the through hole 82, and this disk-like lid member 104 serves as a closure member having a flow guiding concave surface 103 which is circular as a whole and is constituted by a semispherical concave surface 101 formed in an annular shape as a whole and having a smaller radius than the radius of the semispherical concave surface 12 in terms of the curvature and by a circular flat surface 102 connected continuously to the semispherical concave surface 101. Similarly, a disk-like lid member 114 may be fitted in the through hole 86, and this disk-like lid member 114 serves as a closure member having a flow guiding concave surface 113 which is circular as a whole and is constituted by a semispherical concave surface 111 formed in an annular shape as a whole and having a smaller radius than the radius of the semispherical concave surface 17 in terms of the curvature and by a flat surface 112 circular as a whole and connected continuously to the semispherical concave surface 111. In this case, the hollow portion 8 includes the columnar hollow portion 34 defined by the inner peripheral surface 33, a truncated conical hollow portion 121 defined by the flow guiding concave surface 103 and connected continuously to one end face of the columnar hollow portion 34 in the laminated direction A, and a truncated conical hollow portion 122 defined by the flow guiding concave surface 113 and connected continuously to another end face of the columnar hollow portion 34 in the laminated direction A. Thus, the lead plug 9 includes the columnar portion 42 as well as truncated conical portions 125 and 126 respectively serving as the one end portion 11 and the other end portion 16 which are continuously connected to the one end face and the other end face of the columnar portion 42 in the laminated direction A, the columnar portion 42 as well as truncated conical portions 125 and 126 are filled in the columnar hollow portion 34 and the truncated conical hollow portions 121 and 122, respectively. In the seismic isolation apparatus 1 having such lid members 104 and 114, shear keys 115 and 116 may be respectively fitted in between the upper mounting plate 21 with the through hole 64 omitted and the lid member 104 and between the lower mounting plate 23 with the through hole 74 omitted and the lid member 114, as shown in FIG. 5.

Also with the seismic isolation apparatus 1 shown in FIG. 5, in the deformation in the shearing direction B of the lead plug 9 due to the vibration in the shearing direction B of the laminated body 7, by virtue of the flow guiding concave surfaces 103 and 113 it is possible to effectively guide and assist the plastic flow C and D of the one end portion 11 and the other end portion 16 of the lead plug 9 at the one end portion 10 and the other end portion 15 of the hollow portion 8, and it is possible to more effectively ensure the plastic flow C and D of the one end portion 11 and the other end portion 16 of the lead plug 9 at the one end portion 10 and the other end portion 15 of the hollow portion 8, thereby making it possible to further improve the seismic isolation effect.

Figure 6:
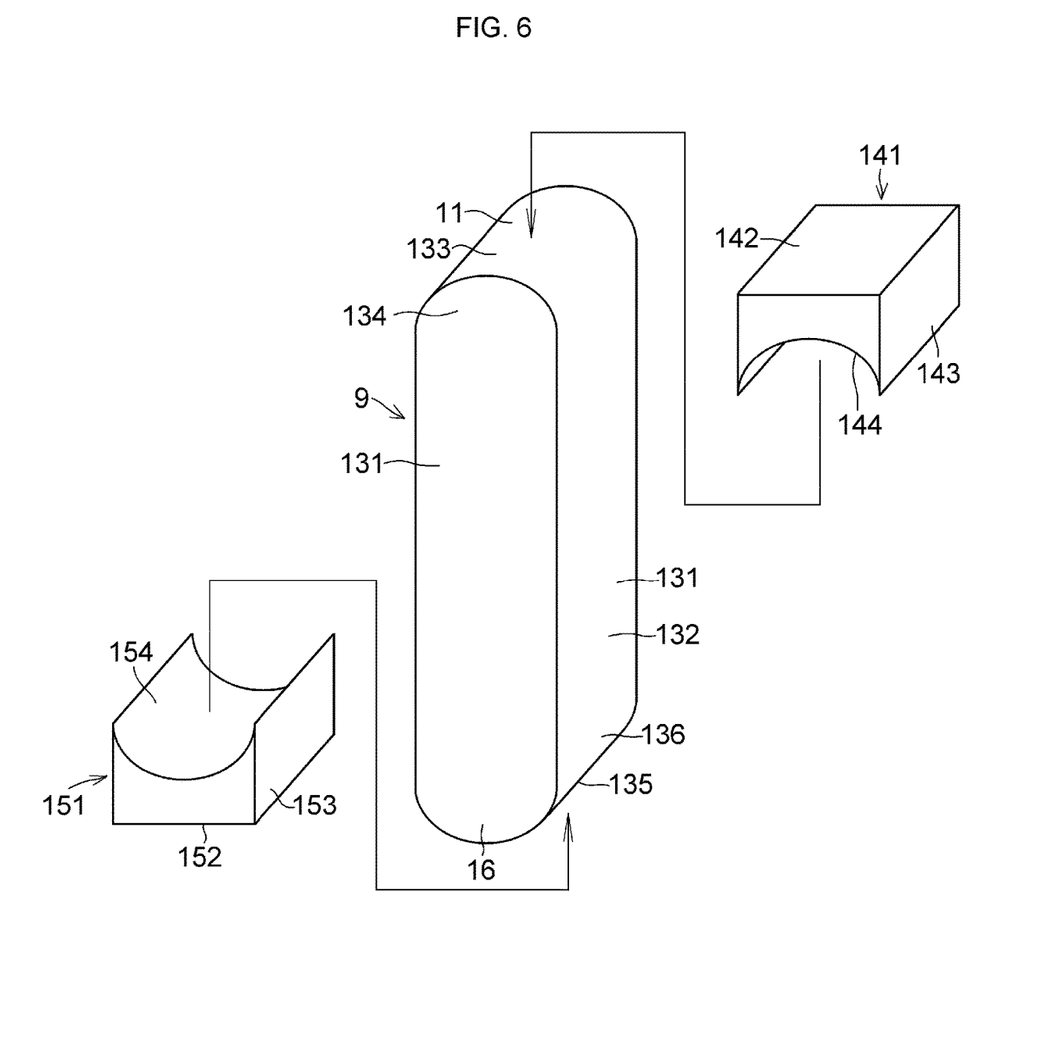
FIG. 6 is an explanatory perspective view of the vibration damping member and the lid members in still another preferred embodiment of the invention.

In the above-described seismic isolation apparatus 1, the lead plug 9 as a vibration damping member includes the columnar portion 42 and the semispherical portions 43 and 45 or the truncated conical portions 125 and 126. Alternatively, however, as shown in FIG. 6, the lead plug 9 as the vibration damping member may include a quadrangular prism portion 132 having four rectangular outer surfaces 131, a semicolumnar portion 134 having a semicylindrical surface 133 and connected continuously to one end face of the quadrangular prism portion 132 in the laminated direction A, and a semicolumnar portion 136 having a semicylindrical surface 135 and connected continuously to another end face of the quadrangular prism portion 132 in the laminated direction A. In this case, a lid member 141 corresponding to the lid member 14 as the closure member includes a rectangular surface 142 corresponding to the circular surface 52, deformed rectangular cylindrical surfaces 143 corresponding to the cylindrical surface 51, and a semicylindrical concave surface 144 corresponding to the semispherical concave surface 12 as the flow guiding concave surface and having a complementary shape to the semicylindrical surface 133 so as to be brought into close contact with the semicylindrical surface 133. Meanwhile, a lid member 151 corresponding to the lid member 19 as the closure member includes a rectangular surface 152 corresponding to the circular surface 56, deformed rectangular cylindrical surfaces 153 corresponding to the cylindrical surface 55, and a semicylindrical concave surface 154 corresponding to the semispherical concave surface 17 as the flow guiding concave surface and having a complementary shape to the semicylindrical surface 135 so as to be brought into close contact with the semicylindrical surface 135. In the seismic isolation apparatus 1 having such a lead plug 9 and such lid members 141 and 151, the hollow portion 8 filled with that lead plug 9 includes a quadrangular prism-like hollow portion in which the quadrangular prism portion 132 is disposed and which is defined by rectangular cylindrical surfaces (complementarily corresponding to the outer surface 131) constituted by respective rectangular inner peripheral surfaces of the rubber plates 2 and respective rectangular inner peripheral surfaces of the steel plates 3c, a semicolumnar hollow portion which is defined by the semicylindrical concave surface 144 and is continuously connected to one end face of this quadrangular prism-like hollow portion in the laminated direction A and in which the semicolumnar portion 134 is disposed, and another semicolumnar hollow portion which is defined by the semicylindrical concave surface 154 and is continuously connected to another end face of the quadrangular prism-like hollow portion in the laminated direction A and in which the semicolumnar portion 136 is disposed. The lid member 141 is fitted in the steel plate 3a and the upper mounting plate 21 without a clearance, i.e., in, instead of the circular through holes 82 and 64, a rectangular through hole 82 defined by rectangular inner peripheral surfaces of the steel plate 3a and a rectangular through hole 64 defined by rectangular inner peripheral surfaces 63 of the upper mounting plate 21. Meanwhile, the lid member 151 is fitted in the steel plate 3a and the upper mounting plate 21 without a clearance, i.e., in, instead of the circular through holes 86 and 74, a rectangular through hole 86 defined by rectangular inner peripheral surfaces of the steel plate 3b and a rectangular through hole 74 defined by rectangular inner peripheral surfaces 73 of the lower mounting plate 23.

Also with the seismic isolation apparatus 1 having the lead plug 9, the hollow portion 8 filled with that lead plug 9 without a clearance, and the lid members 141 and 151, as shown in FIG. 6, in the deformation in the shearing direction B of the lead plug 9 due to the vibration in the shearing direction B of the laminated body 7, by virtue of the semicylindrical concave surfaces 144 and 154 it is possible to effectively guide and assist the plastic flow C and D of the one end portion 11 and the other end portion 16 of the lead plug 9 at the one end portion 10 and the other end portion 15 of the hollow portion 8, and it is possible to more effectively ensure the each of plastic flow C and D of the semicolumnar portions 134 and 136 at the one end portion 11 and the other end portion 16 of the lead plug 9, thereby making it possible to further improve the seismic isolation effect.

Figure 7:
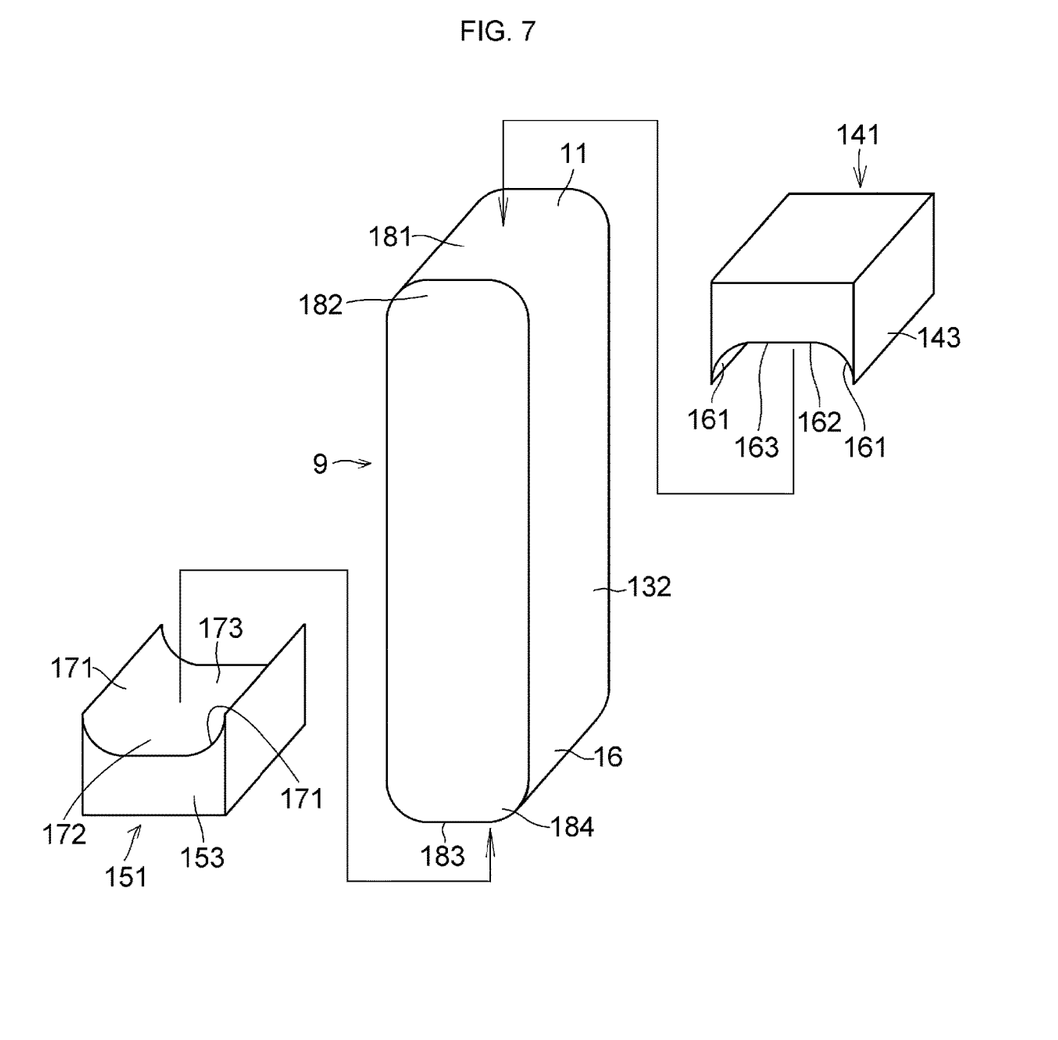
FIG. 7 is an explanatory perspective view of the vibration damping member and the lid members in a further preferred embodiment of the invention

In addition, in the lid member 141, as shown in FIG. 7, instead of the flow guiding concave surface constituted by the semicylindrical concave surface 144, the flow guiding concave surface may be constituted by a flow guiding concave surface 163 which is rectangular as a whole and is constituted by a pair of semicylindrical concave surfaces 161 each formed in a rectangular shape as a whole and having a smaller radius than the radius of the semicylindrical concave surface 144 in terms of the curvature and by a flat surface 162 which is rectangular as a whole and is continuously connected to each of the pair of semicylindrical concave surfaces 161. Meanwhile, in the lid member 151, instead of the flow guiding concave surface constituted by the semicylindrical concave surface 154, the flow guiding concave surface may be constituted by a flow guiding concave surface 173 which is rectangular as a whole and is constituted by a pair of semicylindrical concave surfaces 171 each formed in a rectangular shape as a whole and having a smaller radius than the radius of the semicylindrical concave surface 154 in terms of the curvature and by a flat surface 172 which is rectangular as a whole and is continuously connected to each of the pair of semicylindrical concave surfaces 171. Thus, the hollow portion 8 may be formed by including a quadrangular prism-like hollow portion corresponding to the quadrangular prism portion 132, a rectangular base-shaped hollow portion defined by the flow guiding concave surface 163 of the lid member 141, and a rectangular base-shaped hollow portion defined by the flow guiding concave surface 173 of the lid member 151. In this case, the lead plug 9 is constituted by the quadrangular prism portion 132 disposed in the quadrangular prism-like hollow portion, a rectangular base portion 182 disposed in the rectangular base-shaped hollow portion defined by the flow guiding concave surface 163 and having an upper surface 181 of a complementary shape to the flow guiding concave surface 163, and a rectangular base portion 184 disposed in the rectangular base-shaped hollow portion defined by the flow guiding concave surface 173 and having a lower surface 183 of a complementary shape to the flow guiding concave surface 173.

Also with the seismic isolation apparatus 1 having the lid members 141 and 151 and the lead plug 9, shown in FIG. 7, as well as the hollow portion 8 filled with that lead plug 9 without a clearance, in the deformation in the shearing direction B of the lead plug 9 due to the vibration in the shearing direction B of the laminated body 7, by virtue of the flow guiding concave surfaces 163 and 173 it is possible to effectively guide and assist the plastic flow C and D of the one end portion 11 and the other end portion 16 of the lead plug 9 at the one end portion 10 and the other end portion 15 of the hollow portion 8, and it is possible to more effectively ensure the each of plastic flow C and D of the rectangular base portions 182 and 184 at the one end portion 11 and the other end portion 16 of the lead plug 9, thereby making it possible to further improve the seismic isolation effect.

The seismic isolation apparatus 1 having the lead plug 9 such as the one shown in FIGS. 1 through 5 has non-directionality with respect to the shear deformation in the shearing direction B of the laminated body 7. However, the seismic isolation apparatus 1 having the lead plug 9 such as the one shown in FIG. 6 or 7 is provided with directionality with respect to the shear deformation in the shearing direction B of the laminated body 7. It should be noted that, in the seismic isolation apparatus 1 shown in FIG. 6 or 7, corner portions may be provided with chamfering, e.g., R chamfering.

In addition, in substitution of the lid members 14 and 19, the led plug 9, and the hollow portion 8 shown in FIGS. 1 to 5, the lid members 141 and 151 and the led plug 9 and the hollow portion 8 filled with that lead plug 9 without a clearance shown in FIG. 7 may be used in the seismic isolation apparatus 1 shown in FIGS. 1 to 5.

DESCRIPTION OF REFERENCE NUMERALS

1: seismic isolation apparatus
2: rubber plate
3: steel plate
4, 5: outer peripheral surface
6: coating layer
7: laminated body
8: hollow portion
9: lead plug
10, 11: one end portion
12, 17: semispherical concave surface
13: one end
14, 19: lid member
15, 16: another end portion
18: another end
20: upper surface
21: upper mounting plate
22: lower surface
23: lower mounting plate

The invention claimed is:
1. A seismic isolation apparatus comprising:
a laminated body having alternately laminated elastic layers and rigid layers;
a hollow portion provided in an interior of said laminated body in a hermetically closed manner and extending in a laminated direction;
a vibration damping member which is densely filled in said hollow portion and is adapted to damp vibration in a shearing direction of said laminated body by absorbing vibrational energy in the shearing direction of said laminated body; and a first closure member which closes one end in the laminated direction of said hollow portion and has a first flow guiding concave surface which comes into contact with one end portion in the laminated direction of said vibration damping member, in order to guide and assist plastic flow of said vibration damping member at one end portion in the laminated direction of said hollow portion in deformation of said vibration damping member due to the vibration in the shearing direction of said laminated body, said hollow portion being defined by inner peripheral surfaces of the elastic layers and the rigid layers and by the first flow guiding concave surface, wherein said hollow portion includes a columnar hollow portion defined by the inner peripheral surfaces of the elastic layers and the rigid layers and a semispherical hollow portion defined by the first flow guiding concave surface, and the first flow guiding concave surface has a semispherical concave surface.

2. The seismic isolation apparatus according to claim 1, further comprising:

a second closure member which closes another end in the laminated direction of said hollow portion and has a second flow guiding concave surface which comes into contact with another end portion in the laminated direction of said vibration damping member, in order to guide and assist the plastic flow of said vibration damping member at another end portion in the laminated direction of said hollow portion in the deformation of said vibration damping member due to the vibration in the shearing direction of said laminated body, said hollow portion being further defined by the second flow guiding concave surface.

3. The seismic isolation apparatus according to claim 2, wherein said hollow portion includes a semispherical hollow portion defined by the second flow guiding concave surface, and the second flow guiding concave surface has a semispherical concave surface.

4. The seismic isolation apparatus according to claim 1, wherein said vibration damping member is formed of a damping material which effects absorption of the vibrational energy through the deformation.

5. The seismic isolation apparatus according to claim 1, wherein said vibration damping member is formed of a damping material which effects absorption of the vibrational energy through the plastic flow.

6. A seismic isolation apparatus comprising:

a laminated body having alternately laminated elastic layers and rigid layers;

a hollow portion provided in an interior of said laminated body in a hermetically closed manner and extending in a laminated direction;

a vibration damping member which is densely filled in said hollow portion and is adapted to damp vibration in a shearing direction of said laminated body by absorbing vibrational energy in the shearing direction of said laminated body; and a first closure member which closes one end in the laminated direction of said hollow portion and has a first flow guiding concave surface which comes into contact with one end portion in the laminated direction of said vibration damping member, in order to guide and assist plastic flow of said vibration damping member at one end portion in the laminated direction of said hollow portion in deformation of said vibration damping member due to the vibration in the shearing direction of said laminated body, said hollow portion being defined by inner peripheral surfaces of the elastic layers and the rigid layers and by the first flow guiding concave surface, wherein said hollow portion includes a columnar hollow portion defined by the inner peripheral surfaces of the elastic layers and the rigid layers and a truncated conical hollow portion defined by the first flow guiding concave surface, and the first flow guiding concave surface has a semispherical concave surface and a flat surface connected continuously to the semispherical concave surface.

7. The seismic isolation apparatus according to claim 6, further comprising:

a second closure member which closes another end in the laminated direction of said hollow portion and has a second flow guiding concave surface which comes into contact with another end portion in the laminated direction of said vibration damping member, in order to guide and assist the plastic flow of said vibration damping member at another end portion in the laminated direction of said hollow portion in the deformation of said vibration damping member due to the vibration in the shearing direction of said laminated body, said hollow portion being further defined by the second flow guiding concave surface.

8. The seismic isolation apparatus according to claim 7, wherein said hollow portion includes a truncated conical hollow portion defined by the second flow guiding concave surface, and the second flow guiding concave surface has a semispherical concave surface and a flat surface connected continuously to the semispherical concave surface.

9. The seismic isolation apparatus according to claim 6, wherein said vibration damping member is formed of a damping material which effects absorption of the vibrational energy through the deformation.

10. The seismic isolation apparatus according to claim 6, wherein said vibration damping member is formed of a damping material which effects absorption of the vibrational energy through the plastic flow.

11. A seismic isolation apparatus comprising:

a laminated body having alternately laminated elastic layers and rigid layers;

a hollow portion provided in an interior of said laminated body in a hermetically closed manner and extending in a laminated direction;

a vibration damping member which is densely filled in said hollow portion and is adapted to damp vibration in a shearing direction of said laminated body by absorbing vibrational energy in the shearing direction of said laminated body; and a first closure member which closes one end in the laminated direction of said hollow portion and has a first flow guiding concave surface which comes into contact with one end portion in the laminated direction of said vibration damping member, in order to guide and assist plastic flow of said vibration damping member at one end portion in the laminated direction of said hollow portion in deformation of said vibration damping member due to the vibration in the shearing direction of said laminated body, said hollow portion being defined by inner peripheral surfaces of the elastic layers and the rigid layers and by the first flow guiding concave surface, wherein said hollow portion includes a quadrangular prism-like hollow portion defined by the inner peripheral surfaces of the elastic layers and the rigid layers and a semicolumnar hollow portion defined by the first flow guiding concave surface, and the first flow guiding concave surface has a semicylindrical concave surface.

12. The seismic isolation apparatus according to claim 11, further comprising:

a second closure member which closes another end in the laminated direction of said hollow portion and has a second flow guiding concave surface which comes into contact with another end portion in the laminated direction of said vibration damping member, in order to guide and assist the plastic flow of said vibration damping member at another end portion in the laminated direction of said hollow portion in the deformation of said vibration damping member due to the vibration in the shearing direction of said laminated body, said hollow portion being further defined by the second flow guiding concave surface.

13. The seismic isolation apparatus according to claim 12, wherein said hollow portion includes a semicolumnar hollow portion defined by the second flow guiding concave surface, and the second flow guiding concave surface has a semicylindrical concave surface.

14. The seismic isolation apparatus according to claim 11, wherein said vibration damping member is formed of a damping material which effects absorption of the vibrational energy through the deformation.

15. The seismic isolation apparatus according to claim 11, wherein said vibration damping member is formed of a damping material which effects absorption of the vibrational energy through the plastic flow.

16. A seismic isolation apparatus comprising:

a laminated body having alternately laminated elastic layers and rigid layers;

a hollow portion provided in an interior of said laminated body in a hermetically closed manner and extending in a laminated direction;

a vibration damping member which is densely filled in said hollow portion and is adapted to damp vibration in a shearing direction of said laminated body by absorbing vibrational energy in the shearing direction of said laminated body; and a first closure member which closes one end in the laminated direction of said hollow portion and has a first flow guiding concave surface which comes into contact with one end portion in the laminated direction of said vibration damping member, in order to guide and assist plastic flow of said vibration damping member at one end portion in the laminated direction of said hollow portion in deformation of said vibration damping member due to the vibration in the shearing direction of said laminated body, said hollow portion being defined by inner peripheral surfaces of the elastic layers and the rigid layers and by the first flow guiding concave surface, wherein said hollow portion includes a quadrangular prism-like hollow portion defined by the inner peripheral surfaces of the elastic layers and the rigid layers and a rectangular base-shaped hollow portion defined by the first flow guiding concave surface, and the first flow guiding concave surface has a pair of semicylindrical concave surfaces and a flat surface connected continuously to each of the pair of semicylindrical concave surfaces.

17. The seismic isolation apparatus according to claim 16, further comprising:

a second closure member which closes another end in the laminated direction of said hollow portion and has a second flow guiding concave surface which comes into contact with another end portion in the laminated direction of said vibration damping member, in order to guide and assist the plastic flow of said vibration damping member at another end portion in the laminated direction of said hollow portion in the deformation of said vibration damping member due to the vibration in the shearing direction of said laminated body, said hollow portion being further defined by the second flow guiding concave surface.

18. The seismic isolation apparatus according to claim 17, wherein said hollow portion includes a rectangular base-shaped hollow portion defined by the second flow guiding concave surface, and the second flow guiding concave surface has a pair of semicylindrical concave surfaces and a flat surface connected continuously to each of the pair of semicylindrical concave surfaces.

19. The seismic isolation apparatus according to claim 16, wherein said vibration damping member is formed of a damping material which effects absorption of the vibrational energy through the deformation.

20. The seismic isolation apparatus according to claim 16, wherein said vibration damping member is formed of a damping material which effects absorption of the vibrational energy through the plastic flow.

* * * * *